US006824638B1

(12) United States Patent
Anderson et al.

(10) Patent No.: US 6,824,638 B1
(45) Date of Patent: Nov. 30, 2004

(54) GRAPHIC IMAGE FILM REGISTRATION SYSTEMS AND METHODS

(75) Inventors: Conrad V. Anderson, Minneapolis, MN (US); Brett A. Behnke, Welch, MN (US); John R. David, Stillwater, MN (US); Ronald S. Steelman, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 358 days.

(21) Appl. No.: 09/626,621

(22) Filed: Jul. 27, 2000

(51) Int. Cl.[7] .............................................. B32B 31/00
(52) U.S. Cl. ........................... 156/229; 156/64; 156/71
(58) Field of Search ............................ 156/63, 64, 71, 156/160, 229, 247, 574

(56) References Cited

U.S. PATENT DOCUMENTS 1,498,618 A * 6/1924 Fritz .......................... 156/526
4,049,479 A * 9/1977 Siker ........................... 156/71
4,412,876 A * 11/1983 Lerner et al. ............... 156/212
4,490,198 A * 12/1984 Mitchell ...................... 156/267
4,620,888 A * 11/1986 Easter et al. .................. 156/64
4,795,513 A * 1/1989 Jensen, Jr. .................. 156/361
4,806,184 A * 2/1989 Shannon ...................... 156/577
4,857,745 A * 8/1989 Gough ....................... 250/548
4,867,816 A 9/1989 Suiter
4,944,514 A 7/1990 Suiter
4,964,070 A 10/1990 Markoff et al.
5,138,667 A * 8/1992 Roch et al. ................. 382/112
5,217,550 A 6/1993 Takeuchi et al.
5,252,166 A * 10/1993 Krawczyk .................... 156/71
5,389,476 A 2/1995 Kruchko
5,431,763 A * 7/1995 Bradshaw ................... 156/256
5,447,486 A * 9/1995 Anderson et al. ............. 493/11
5,695,106 A * 12/1997 Bauknecht ..................... 226/2
5,950,319 A * 9/1999 Harris ......................... 33/1 B
6,024,821 A * 2/2000 Cousineau .................. 156/267
6,354,984 B1 * 3/2002 Hensley et al. ............... 493/11
6,450,644 B1 * 9/2002 Goodhill et al. ............ 352/160
6,452,147 B1 * 9/2002 Inada ...................... 250/208.1

FOREIGN PATENT DOCUMENTS

EP 0 354 230 B1 2/1990
FR 2 300 249 9/1976
WO WO 97/21206 6/1997
WO WO 97/31077 8/1997

OTHER PUBLICATIONS

Brady, H., "Ten Steps to Successful Vinyl Truck Lettering," *SignCraft Magazine*, Issue 74, Jan./Feb. 1994.

* cited by examiner

*Primary Examiner*—Sue A. Purvis
(74) *Attorney, Agent, or Firm*—Colene H. Blank

(57) ABSTRACT

Methods of forming composite graphic images on a substrate using a plurality of films that are applied and registered with each other under tension are disclosed. The films may include registration marks distributed along their lengths and those registration marks can be used to vary the tension under which the films are dispensed during application to a substrate. By detecting the registration marks on a film already applied to a substrate and detecting corresponding registration marks on a film being dispensed and applied to the substrate, registration between the different portions of the composite image on the different films can be maintained over the length of the films and, therefore, the length of the resulting composite image. That registration is controlled by varying tension of the film being applied.

39 Claims, 3 Drawing Sheets

GRAPHIC IMAGE FILM REGISTRATION SYSTEMS AND METHODS

FIELD OF THE INVENTION

The present invention relates to the field of graphic image films. More particularly, the present invention provides methods of registering composite graphic images on films as the films are applied to a substrate and kits including films used to form a composite image.

BACKGROUND OF THE INVENTION

Composite images formed using multiple films with complementary portions of the composite images formed thereon are often used for advertising on, e.g., trucks, signs, and other large surfaces. The images must often be provided as composites using multiple films due to size limitations in the manufacturing and application of the films on which the images are provided, i.e., one film that is large enough to contain the entire image may be impossible to produce and/or apply.

Although film-based graphic images can typically be made in unlimited lengths (particularly when using digital imaging methods), variations during the imaging processes may also introduce errors into the manufactured-length of the images on the films. For example, differences in brake tension during manufacturing can easily cause a difference in manufactured film length of 0.1%. These errors can be accommodated with known manual application techniques using relatively short panels because skilled applicators can adjust the film dimensions during installation. If, however, the films are to be applied to a large surfaces such as a semitrailer that is, e.g., 53 feet (16 meters) long, the errors in the images on two different films may be about 0.5 inches (1.25 centimeters), which is typically unacceptable.

In addition to the dimensional tolerance errors that can be introduced into long films during imaging, very long films are also difficult to handle and apply by conventional techniques. As a result, the complete composite images are typically formed using a number of panels of film that are, e.g., 36 to 48 inches (about 1 to 1.25 meters) wide and 8 to 9 feet (about 2.5 to 3 meters) long. Each panel includes a portion of the composite image and, thus, the panels must be properly aligned with each other to present a high quality composite image to a viewer.

The composite image is formed on the substrate by manually adhering the films to the substrate using, in most cases, a pressure sensitive adhesive. An applicator usually starts at the top of each film and works toward the bottom while removing a liner used to protect the adhesive. The films are laminated to the substrate using manual pressure applied with a squeegee-like device approximately 10 centimeters long. A skilled applicator will stretch or pull each film slightly as it is being applied to maintain registration between the different panels used to form the composite image. Such manual registration helps compensate for any dimensional errors introduced during the imaging processes. Limiting the length of the panels also reduces visible error. The process of aligning and adhering each film is typically, however, labor intensive and requires a high degree of skill on the part of the applicator. Furthermore, the longevity of the resulting composite image can depend on the skill of the applicator in properly adhering the films to the substrate.

SUMMARY OF THE INVENTION

The present invention provides methods of forming composite images on a substrate using a plurality of films that are applied and registered with each other under tension. The films may include registration marks distributed along their lengths and those registration marks can be used to vary the tension under which the films are dispensed during application to a substrate.

By detecting the registration marks already applied to a substrate and detecting corresponding registration marks on a film being dispensed and applied to the substrate, registration between the different portions of the composite images on the different films can be maintained over the length of the films to precisely align all sections of the composite image formed by the films. That registration is controlled by varying tension of the film being applied. It may be advantageous to apply all of the films, including the first film, under at least some continuous level of tension to provide the opportunity to control registration of the later-applied films by varying the tension under which the later-applied films are dispensed. For example, a first film may be dispensed and applied at a predetermined tension or stretch. The tension or stretch on successively applied films can then be varied above and/or below the predetermined setpoint of the first film to control registration.

Other advantages of various aspects of the present invention include the ability to form composite images using films that extend continuously and unbroken along the length of the composite image. As a result, the films forming the composite image may overlap in only one direction with no films required to abut each other along the length of the composite image. In some aspects, the films and the composite image they form may have a length of at least about 5 meters or more, at least about 10 meters or more, and, in some instances, at least about 15 meters or more. It may also be advantageous to dispense the films from rolls.

The registration marks on films already applied to the substrate may be covered by later-applied films. With respect to the last film applied to complete the image, the registration marks may be removed before or after application of the last film to the substrate. Other alternatives include the use of registration marks that are invisible to the unaided human eye, or the use of registration marks that are washable after the films are applied to the substrate. Another alternative is the use of registration marks on the liners used to deliver a film including a pressure sensitive adhesive on one surface.

In one aspect, the present invention provides a method of providing a composite image on a substrate by providing a first film on the substrate, the first film including a first portion of the composite image; providing first registration marks distributed along a length of the first film; providing a second film, the second film including second registration marks distributed along a length of the second film and a second portion of the composite image; aligning the second portion of the composite image on the second film with the first portion of the composite image on the first film; dispensing the second film under tension along the length of the second film; detecting the first and second registration marks during the dispensing; varying the tension along the length of the second film based on the detection of the first and second registration marks to register the first and second portions of the composite image along the lengths of the first and second films; and applying the second film to the substrate. It may be preferred to continuously apply the tension under which the second film is dispensed.

In another aspect, the present invention provides a method of providing a composite image on a substrate by providing a first film on the substrate, the first film including visible first registration marks distributed along a length of the first film and a first portion of the composite image; providing a second film, the second film including visible second registration marks distributed along a length of the second film and a second portion of the composite image; aligning the second portion of the composite image on the second film with the first portion of the composite image on the first film; dispensing the second film under tension along the length of the second film; detecting the first and second registration marks during the dispensing; varying the tension along the length of the second film based on the detection of the first and second registration marks to register the first and second portions of the composite image along the lengths of the first and second films; applying the second film to the substrate and the first film such that a portion of the second film is located over the first registration marks on the first film; and removing the second registration marks from the second film.

In another aspect, the present invention provides an image graphic kit including a composite image having a length and a height transverse to the length; a first film including a first portion of the composite image on a major surface of the first film, adhesive on the opposing major surface of the first film, and a pattern of first registration marks distributed in regular intervals along the length of the first film; and a second film including a second portion of the composite image on a major surface of the second film, adhesive on an opposing major surface of the second film, and a pattern of second registration marks distributed in regular intervals along the length of the second film. These and other features and advantages of the present invention are described below in connection with some illustrative embodiments of the invention.

DESCRIPTION OF ILLUSTRATIVE EMBODIMENTS OF THE INVENTION

The present invention is used in connection with the formation of relatively large graphic images on, e.g., trucks, buildings, walls, etc. Such images are typically provided using films on which an image has been formed by some printing technique that is suitable for the environment in which the image is to be located. An opposing major surface of such films is typically provided with an adhesive, e.g., pressure sensitive adhesive, heat-activated adhesive, etc. Suitable films may be made of, e.g., materials including, but not limited to, polyvinyl chloride, polyolefin materials (e.g., polyethylene or polypropylene), polyester, etc. Suitable imaging processes include, but are not limited to, electrostatic printing, ink jet printing, screen printing, etc. In many instances, these films are provided with an adhesive on the side opposite the image. 5% Suitable adhesives may include, but are not limited to, pressure sensitive adhesives, contact adhesives, heat activated adhesives, etc. Other films and imaging processes may be used to provide suitable imaged films as well.

Figure 1:
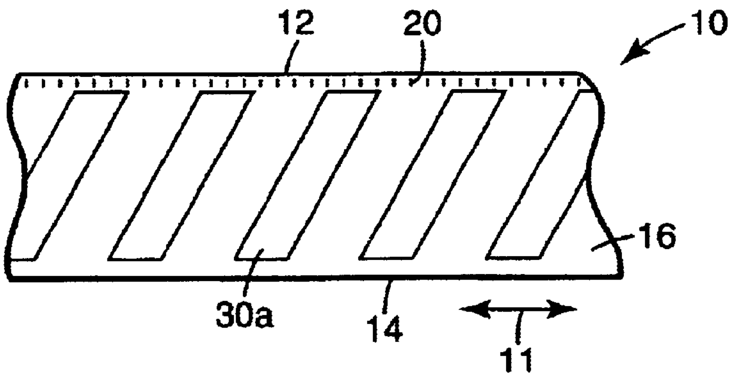
FIG. 1 depicts a portion of a film including registration marks located thereon.

FIG. 1 depicts one illustrative film 10 useful in connection with the present invention. One major surface 16 of the film 10 is depicted in FIG. 1 and that surface will have a portion 30*a* of a composite image located thereon. The film 10 has a length extending in the direction of arrow 11 and a width between opposing edges 12 and 14 that is typically measured transverse to the length of the film 10. In some instances, the first portion 30*a* of the composite image may simply be white space with the film 10 having a width large enough to accommodate the registration marks 20, but significantly smaller than the other films used to form the composite image.

In addition to a portion 30*a* of a composite image, the depicted film 10 also includes registration marks 20 that, in the depicted embodiment, are located on the major surface 16 on which the image portion 30*a* is located. The registration marks 20 may take a variety of forms and be located in a variety of positions on the film 10.

Regardless of their form or position on the film 10, the registration marks 20 should be located in known positions along the length of the film 10 relative to the image portion 30*a*. It may be preferred that the marks 20 be distributed along the length of the film 10 at regular intervals.

Furthermore, although it may be possible to use registration marks 20 that are all of the same size and/or shape, it may also be advantageous to include differently shaped or sized registration marks to indicate, e.g., one end of a composite image, distance to or from an end of the film being applied, etc. It may be particularly useful to provide a different registration mark at the beginning of the composite image to aid in precise alignment of the films at the start of the lamination process, especially where the films are provided in roll form with the remainder of the image obscured within the roll.

Any suitable shape may be used for the registration marks 20, e.g., rectangular, etc. If rectangular registration marks 20 are used, they may have dimensions such as, e.g., 0.125 inches (about 3 millimeters) along the length of the film 10 and a dimension of about 1 inch (2.5 centimeters) across the width of the film 10 (transverse to the length).

Figure 1A:
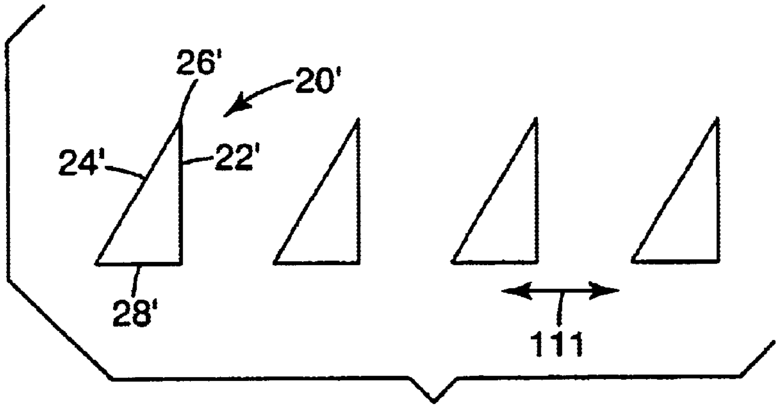
FIG. 1A is an enlarged view of one set of registration marks useful in connection with the present invention.

Rectangular registration marks 20 distributed along the length of the film 10 can be used to register along the length of the film 10 (and the composite image formed by the films). Such registration marks may not, however, be particularly useful in providing registration in directions other than along the length of the films 10. The registration marks 20' depicted in FIG. 1A may, however, be useful in registering the films in the direction of their width (i.e., cross-web direction).

Each of the registration marks 20' includes a leading edge 22' and trailing edge 24'. It may be preferred, but not required, that at least one of the edges 22' or 24' be perpendicular to the length of the film (indicated by arrow 11'). The distance between the leading edge 22' and trailing edge 24' should, however, vary in the direction of the film width. In the depicted registration mark 20', the distance between the leading and trailing edges 22' and 24' reaches a minimum at an upper end 26' and a maximum at a lower end 28'. It will be understood that registration marks with shapes providing a variable distance between leading and trailing edges may be used in place of the triangular marks 20' depicted in FIG. 1A.

As the film moves past a suitable registration mark sensor, the time required for the leading and trailing edges 22' and 24' to pass the sensor can be measured. If the time is increasing, it indicates that the film is moving in the direction of the upper end 26' of the registration mark 20' in FIG. 1A (relative to a fixed position sensor). If the time is decreasing, it indicates that the film is moving in the opposite direction. Based on these measurements, the film can be steered in a desired direction to correct registration of the image in a direction transverse to the length of the films.

Regardless or their shape, the registration marks 20 are preferably distributed along the length of the film 10 over a distance that is at least as long as any image provided thereon so that the portions of the composite image 30 on different films can be registered as discussed in more detail below. Those portions of the film 10 that extend beyond any image requiring registration may or may not include registration marks 20.

The registration marks 20 may be visible or invisible depending on the materials used to form the marks 20. By "visible," as used herein, it is meant that the marks 20 can be seen by the unaided human eye in visible light. By "invisible," as used herein, it is meant that the marks 20 cannot be seen by the unaided human eye in visible light. Invisible registration marks may be provided of materials that can be detected using a variety of techniques dependent on the material used to form the marks. Examples include, but are not limited to, fluorescent materials (e.g., materials that fluoresce when exposed to suitable electromagnetic radiation), magnetic materials, etc.

Whether visible or invisible, the registration marks 20 may be washable, where the term "washable" as used herein means that the marks can be removed from the film 10 using a solvent, e.g., water, alcohol, etc. It may be preferred that the registration marks be washable using water with or without a detergent or other composition. In such a situation, the marks 20 may advantageously be removed merely by exposing the film 10 to rain.

The registration marks 20 on film 10 may preferably be located proximate an edge 12 of the film 10. When so placed, the registration marks 20 may be either covered by later-applied films (see, e.g., FIG. 2) or the portion of the film 10 on which they are located may be removed. Where the registration marks 20 are invisible or washable, they may be located in any suitable location on the film 10.

Figure 2:
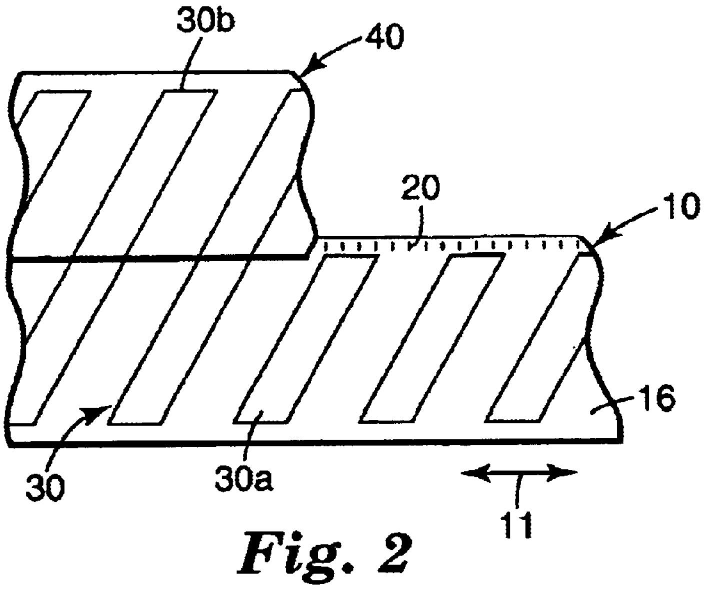
FIG. 2 depicts portions of two films applied to a substrate, both films including registration marks located thereon.

FIG. 2 depicts a portion of a second film 40 applied over the registration marks 20 on film 10. The second film 40 includes a second portion **30*b* of the composite image 30 that is preferably in register with the portion 30*a* of the composite image 30 on the first film 10. As depicted, it may be preferred that the registration marks 20 on the first film 10 be covered by the second film 40 such that the registration marks 20 on the first film 10 are not visible after the second film 40 is in position on the substrate. This may, however, not be required if the registration marks 20 are invisible, washable, etc. The second film 40 may also preferably include registration marks (not shown) to assist in registering the different portions of the image 30 on the two films 10 and 40. Any such marks, however, if visible and not washable, are preferably removed from the film 40 such that they do not interfere with the composite image 30. Various techniques for removing any such registration marks are discussed below with respect to FIG. 4**.

Although FIG. 2 depicts a graphic image provided by only two films, the graphic images provided in accordance with the present invention may be formed by three or more films arranged in a direction transverse to their length, each of which contains a portion of the entire composite image. Regardless of the number of films used, however, all of the films used to provide the graphic images may preferably extend continuously and unbroken in at least one direction of the composite image.

Figure 3:
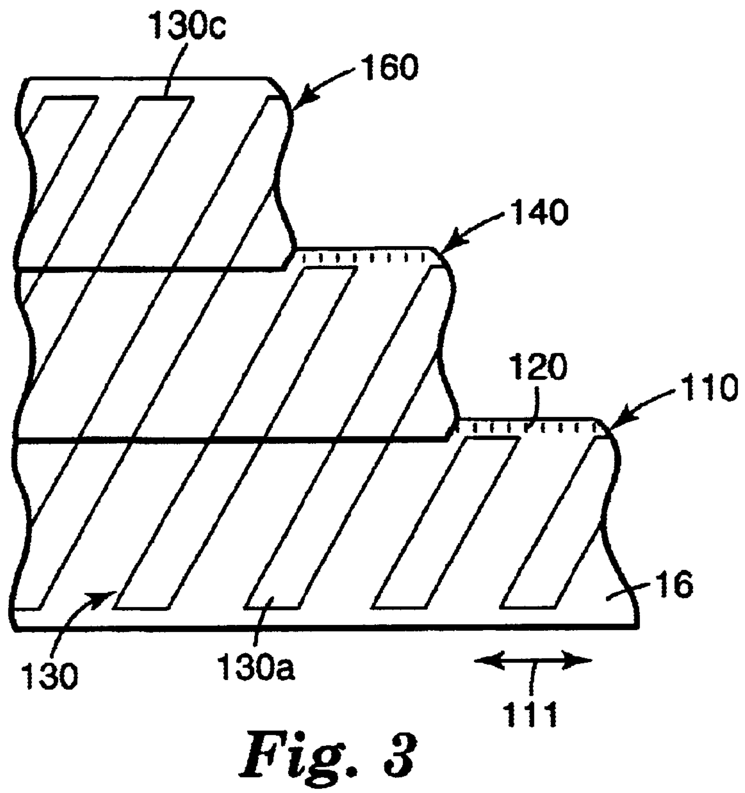
FIG. 3 depicts an image formed by three films according to the present invention.

FIG. 3 depicts an illustrative set of three films 110, 140, and 160 used to provide a composite image 130 on a substrate. The first film 110 includes registration marks 120 and the second film 140 includes registration marks 150. A portion of the second film 140 may preferably be applied over the registration marks 120 on film 110. The second film 140 includes a second image portion **130*b* that is preferably in register with the first image portion 130*a* on the first film 110. As depicted, it may be preferred that the registration marks 120 on the first film 110 be covered by the second film 140 such that the registration marks 120 on the first film 110 are not visible after the second film 140 is in position on the substrate. This may, however, not be required if the registration marks 120** are invisible, washable, etc.

A portion of the third film 160 is preferably applied over the registration marks 150 on film 140. The third film 160 includes a third image portion **130*c* that is preferably in register with the second image portion 130*b* on the second film 140. As depicted, it may be preferred that the registration marks 150 on the second film 140 be covered by the third film 160 such that the registration marks 150 on the second film 140 are not visible after the third film 160 is in position on the substrate. This may, however, not be required if the registration marks 150 on the second film 140 are invisible, washable, etc. The third film 160 may also preferably include registration marks (not shown) to assist in registering the third image portion 130*c* with the second image portion 130*b* on the third film 140. Any such marks, however, if visible and not washable, are preferably removed by any suitable technique from the film 160 such that they do not interfere with the entire composite image 130** formed by the different image portions on the different films.

The different films used to form the composite image 130 may be applied all in the same direction or in different directions along the length 111 of the films as desired.

Figure 4:
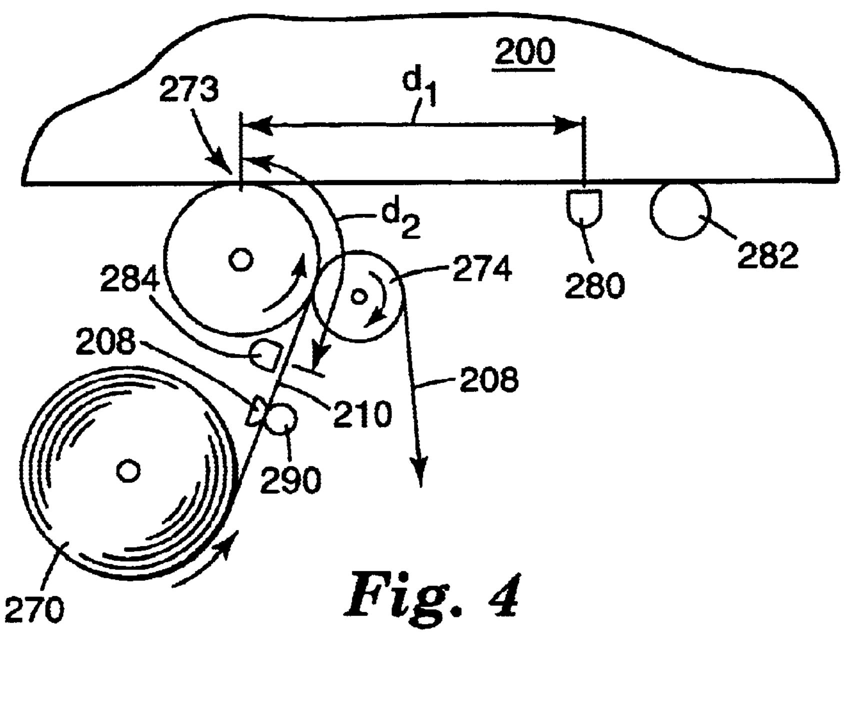
FIG. 4 is a thread-up diagram of one apparatus and method of dispensing and applying films to a substrate according to the present invention.

FIG. 4 illustrates one apparatus that can be used to apply and register films to form images in accordance with the present invention. The apparatus is depicted applying a film 210 to a substrate 200. The film 210 is provided from a source 270 that may preferably be provided in the form of a roll. The film 210 leaves the source 270, travels through a nip formed by laminating roll 272 and nip roll 274. It will be understood that the nip roll 274 is optional.

Figure 4A:
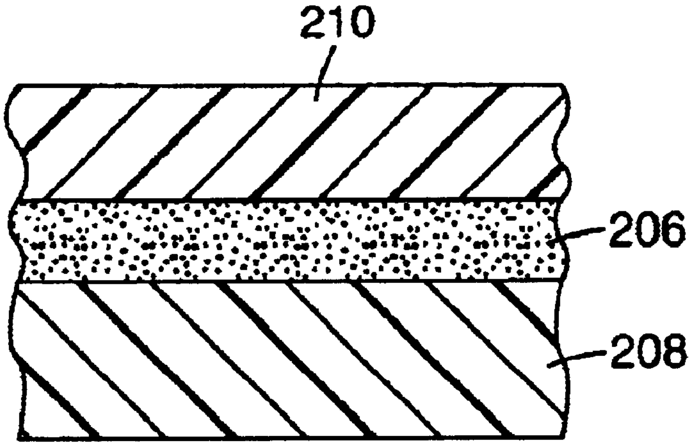
FIG. 4A is an enlarged partial cross-sectional view of the film being dispensed in FIG. 4.

The preferred film 210 is attached to the substrate 200 using an adhesive, e.g., a pressure sensitive adhesive, contact adhesive, heat activated adhesive, etc. It may be preferred that the adhesive be protected by a liner. One construction of a film 210 including an adhesive 208 and protective liner 206 is illustrated in the enlarged partial cross-sectional view of FIG. 4A. Specific adhesives and liners used to laminate films carrying graphic images to substrates are known and will not be described in further detail herein.

In the device, the liner 206 is separated from the film 210 at the nip formed between laminating roll 272 and the optional nip roll 274. If the nip roll 274 is removed, the liner 206 can be stripped from the film 210 at the source roll 270. The film 210 with exposed adhesive 208 is then laminated to the substrate 200 at the nip point 273 formed by laminating roll 272 on substrate 200. The film 210 is applied to the substrate 200 under tension that is applied along the length of the film 210. That tension is preferably applied continuously as the film 210 is laminated to the substrate 200. Examples of suitable minimum tension levels may be, e.g., inducing a stretch of about 0.1% or more, or alternatively about 0.5% or more. At the upper end, suitable tension levels may be provided by inducing a stretch of about 2% or less, or alternatively about 1% or less to the film 210.

It should be noted that if the stretch is to be introduced to the film 210 while the liner 206 is still attached, the selection of materials used for the liner 206 should be consistent with the need to stretch the film 210. In other words, the liner 206 should not prevent stretching of the film/adhesive/liner composite.

When applying multiple films on a substrate, with each of the films including a portion of the same image, the first film may preferably be applied with a constant tension, for example, by inducing a constant stretch of 1% in the film as applied. Successive films would then be applied at a tension as well, with the tension varying about the setpoint used to apply the first film as needed to control registration between the different films.

The tension on film 210 can be applied by any suitable technique used in the handling of webs. In one embodiment, the roll that serves the source 270 of film 210 can be mounted on a mandrel that is operatively connect to a brake, e.g., an air brake, magnetic particle brake, etc. Another potential technique for supplying tension could be provided by underdriving the roll of source 270 relative to the rolls 272 and 274. Many other techniques of imparting tension to webs will be known to those skilled in the art.

The apparatus depicted in FIG. 4 also includes components used to control registration by one suitable method. Among those components are a reference sensor 280 located to detect registration marks on a film already located on the substrate 200. Another component used in registration control is a distance sensor 282 used to measure distance along the substrate 200 as the film 210 is laminated thereto. A third component used in registration control is a film sensor 284 mounted to detect registration marks on the film 210 during application to the substrate 200.

Figure 5:
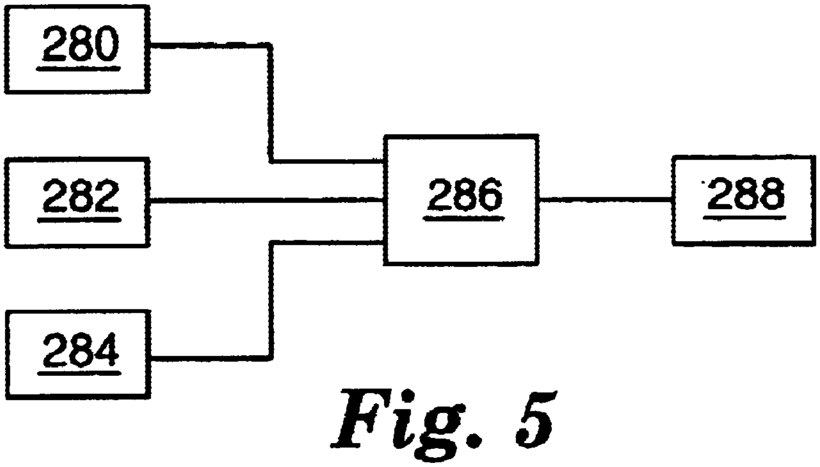
FIG. 5 is a schematic diagram of one control system useful in connection with the apparatus depicted in FIG. 4

Each of these registration control components is illustrated in the block diagram of FIG. 5. The various sensors are connected to a controller 286 that, in turn is operatively connected to a tension control system 288. The tension control system 288 may be a brake or other suitable web tension control apparatus (e.g., including driven rolls, etc.). Regardless of the actual form of the web tension control system used, the sensors 280, 282 and 284 may be used as follows to control web tension as the film 210 is laminated to the substrate 200. It will, however, be understood that the following method represents only one example of tension control and that many other alternative techniques could be used.

The illustrative method relies on a regular spacing, e.g., of about 2 inches (about 5 centimeters), between registration marks on a film already applied to the substrate 200 and the film 210 being applied to the substrate 200. The distance sensor 282 may be provided in the form of a pulse generator mounted on a reference wheel. The pulse generator of distance sensor 282 provides a known number of pulses, e.g., 200 pulses, evenly distributed over a distance of 1 inch (2.5 centimeter).

The illustrative method also relies on the distance (di) that the reference sensor 280 is spaced from nip point 273 (formed between laminating roll 272 and substrate 200). That reference distance $d_1$ preferably differs from the distance ($d_2$) between the film sensor 284 and the nip point 273 by a known value. In one illustrative method, the difference between distances $d_1$ and $d_2$ may preferably be equal to one-half of the distance between the registration marks on the films, e.g., about 1 inch (2.5 centimeters).

During application of the film 210, the reference sensor 280 first detects a reference registration mark on the applied film on substrate 200, thereby signaling the controller 286 to start a counter that counts the pulses provided by the distance sensor 284. Because the offset in distances between $d_1$ and $d_2$ of the registration marks is about 1 inch (2.5 centimeters), the counter in controller 286 should ideally be at about 200 when the film sensor 284 detects its first registration mark on the film 210 (because 200 is one half of the 400 pulses generated between registration marks spaced about 2 inches (5 centimeters) apart). If the counter is outside of a desired range, e.g., above 210 pulses or below 190 pulses, the tension control system 288 can be signaled by the controller 286 to increase or decrease tension as required to bring the film 210 back into register with the film already located on the substrate 200. It will be understood that a wide variety of registration control components could be used in place of those depicted in FIG. 4. Furthermore, the methodology used to control registration may also vary. For example, the registration system may rely on comparisons between a) the distance between registration marks on the applied film and the film being applied; b) the time required for the registration marks to pass the appropriate sensor; c) the number of registration marks passing each sensor, etc. The end result, however, is that tension on the film 210 is varied during application based on the registration marks to provide registration control.

FIG. 4 also depicts one illustrative apparatus for removing the registration marks from the film 210 being applied where the registration marks are located along an edge of the film (see, e.g., FIG. 1). The illustrated removal apparatus may be provided in the form of a score knife 290 acting on the film 210 against a support 292. The knife 290 may be used to cut or score only the film 210 itself (leaving the liner 206 intact) or it may be used to slit through both the film 210 and the liner 206. Where only the film 210 is cut or scored, the portion of the film containing the registration marks is removed with liner 206 at the nip formed by laminating roll 272 and nip roll 274.

Although the film sensor 284 is located downstream from the knife 290 in FIG. 4, it should be understood that it may be possible to locate the film sensor 284 upstream from the knife 290 or any other apparatus used to sever the registration marks from the film 210.

Other potential apparatus that may be used to laminate films in accordance with the present invention are described in commonly assigned, copending U.S. patent application Ser. No. 09/236,807 (filed Jan. 25, 1999) titled FLUID NIP APPLICATOR AND METHODS OF USING SAME; U.S. patent application Ser. No. 09/491,106 (filed Jan. 25, 2000) titled VACUUM-ASSISTED LAMINATOR AND METHODS OF USING THE SAME; and U.S. patent application Ser. No. 09/576,624 (filed May 23, 2000) titled STEERED VACUUM-ASSISTED LAMINATING APPARATUS AND METHODS OF USE. The various apparatus described in these documents use a reduced pressure cavity to assist in the lamination process. Outfitting of these apparatus with the appropriate sensors and controls to effectuate registration control over the films during lamination as described herein may provide additional advantages.

The preceding specific embodiments are illustrative of the practice of the invention. This invention may be suitably practiced in the absence of any element or item not specifically described in this document. The complete disclosures of all patents, patent applications, and publications identified in this document are incorporated by reference herein as if individually incorporated in total.

Various modifications and alterations of this invention will become apparent to those skilled in the art without departing from the scope of this invention, and it should be understood that this invention is not to be unduly limited to illustrative embodiments set forth herein, but is to be controlled by the limitations set forth in the claims and any equivalents to those limitations.

What is claimed is:

1. A method of providing a composite image on a substrate, the method comprising:

providing a first film on the substrate, the first film comprising a first portion of the composite image;

providing first registration marks distributed along a length of the first film;

providing a second film, the second film comprising second registration marks distributed along a length of the second film and a second portion of the composite image;

aligning the second portion of the composite image on the second film with the first portion of the composite image on the first film;

dispensing the second film under tension along the length of the second film;

detecting the first and second registration marks during the dispensing;

varying the tension along the length of the second film based on the detection of the first and second registration marls to register the first and second portions of the composite image along the lengths of the first and second films; and applying the second film to the substrate.

2. A method according to claim 1, wherein the tension under which the second film is dispensed is continuously applied to the second film during the dispensing.

3. A method according to claim 1, wherein the fist registration marks are located on the first film.

4. A method according to claim 1, wherein the first registration marks are visible before the second film is applied to the substrate, and further wherein applying the second film comprises locating the second film over the first registration marks.

5. A method according to claim 1, wherein the second registration marks are visible.

6. A method according to claim 5, further comprising removing at least some of the second registration marks from the second film.

7. A method according to claim 6, wherein the removing comprises removing a portion of the second film.

8. A method according to claim 7, wherein the removing occurs before the second film is applied to the substrate.

9. A method according to claim 1, wherein the first registration marks are invisible.

10. A method according to claim 1, wherein the first registration marks are washable.

11. A method according to claim 1, wherein the second registration marks are invisible.

12. A method according to claim 1, wherein the second registration marks are washable.

13. A method according to claim 1, wherein the second film is attached to a liner as dispensed.

14. A method according to claim 1, wherein the first and second registration marks are distributed in regular intervals.

15. A method according to claim 1, wherein the second film is dispensed from a roll.

16. A method according to claim 15, wherein the second film comprises an orientation indicator proximate an outside end.

17. A method according to claim 1, wherein the first and second films each comprise a width transverse to their length, and wherein the method further comprises registering the first and second portions of the composite image across the widths of the first and second films.

18. A method according to claim 17, wherein registering the first and second portions of the composite image across the widths of the first and second films comprises detecting a distance between a leading edge and a trailing edge of the second registration marks, wherein that distance is indicative of a position across the width of the second film.

19. A method according to claim 1, wherein providing the first film on the substrate comprises applying the first film to the substrate under tension.

20. A method according to claim 1, wherein the first film is applied to the substrate by dispensing the first film from a roll.

21. A method according to claim 1, wherein the composite image, first film, and second film each comprise a continuous length of at least about 5 meters.

22. A method according to claim 1, wherein the composite image, first film, and second film each comprise a continuous length of at least about 10 meters.

23. A method of providing a composite image on a substrate, the method comprising:

providing a first film on the substrate, the first film comprising a first portion of the composite image;

providing visible first registration marks distributed along a length of the first film;

providing a second film, the second film comprising visible second registration marks distributed along a length of the second film and a second portion of the composite image;

aligning the second portion of the composite image on the second film with the first portion of the composite image on the first film;

dispensing the second film under tension along the length of the second film;

detecting the first and second registration marks during the dispensing;

varying the tension along the length of the second film based on the detection of the first and second registration marks to register the first and second portions of the composite image along the lengths of the first and second films;

applying the second film to the substrate and the first film such that a portion of the second film is located over the first registration marks on the first film; and removing the second registration marks from the second film.

24. A method according to claim 23, wherein the removing comprises removing a portion of the second film.

25. A method according to claim 24, wherein the removing occurs before the second film is applied to the substrate.

26. A method of providing a composite image on a substrate, the method comprising:

applying a first film to the substrate while inducing a constant stretch to the first film, the first film comprising a first portion of the composite image;

providing first registration marks distributed along a length of the first film; providing a second rum to the substrate, the second film comprising second registration marks distributed along a length of the second film and a second portion of the composite image;

dispensing the second film under tension along the length of th second film;

detecting the first registration marks and the second registration marks while dispensing the second film;

varying the tension alone the length of the second film based on the detection of the first registration marks and the second registration marks to register the first portion and the second portion of the composite image along the lengths of the first film and the second film; and applying the second film to the substrate while varying the tension along the length of the second film, wherein the second portion of the composite image on the second film is aligned with the first portion of the composite image on the first film.

27. A method according to claim 26, further comprising removing the second registration marks from the second film.

28. A method according to claim 27, wherein removing the second registration marks from the second film comprises removing a portion of the second film.

29. A method according to claim 27, wherein removing the second registration marks from the second film comprises cutting the second film before the second film is applied to the substrate.

30. A method according to claim 26, wherein the first registration marks are invisible.

31. A method according to claim 26, wherein the first registration marks are washable.

32. A method according to claim 26, wherein the second registration marks are invisible.

33. A method according to claim 26, wherein the second registration marks are washable.

34. A method according to claim 26, further comprising:

detecting a distance between a leading edge and a trailing edge of on second registration mark of the plurality of second registration marks, wherein the distance between the leading edge and the trailing edge is indicative of position across the width of the second film; and steering the second film to register the second portion of the composite image to the first portion of the composite image in a direction transverse to the length of the second film.

35. A method according to claim 26, further comprising:

detecting a distance between a leading edge and a trailing edge of the plurality of second registration marks, wherein the detected distance is indicative of a position across the width of the second film; and steering the second film to register the second portion of the composite image to the first portion of the composite image in a direction transverse to the length of the second film.

36. A method of providing a composite image on a substrate, the method comprising:

providing a first film on the substrate, the first film comprising a first portion of the composite image;

providing first registration marks distributed along a length of the first film;

providing second film, the second film comprising second registration marks distributed along a length of the second film and a second portion of the composite image;

aligning the second portion of the composite image on the second film with the first portion of the composite image on the first film;

dispensing the second film under tension along the length of the second film;

detecting the first and second registration marks during the dispensing;

varying the tension along the length of the second film based on the detection of the first and second registration marks to register the first and second portions of the composite image along the lengths of the first and second films;

removing the second registration marks from the second film; and applying the second film to the substrate after removing the second registration marks from the second film.

37. A method according to claim 36, wherein removing the second registration marks from the second film comprises removing a portion of the second film.

38. A method according to claim 36, wherein removing the second registration marks from the second film comprises cutting the second film.

39. A method of providing a composite image on a substrate, the method comprising:

providing a first film on the substrate, the first film comprising a first portion of the composite image;

providing first registration marks distribute along a length of the first film;

providing a second film, the second film comprising second registration marks distributed along a length of the second film and a second portion of the composite image;

aligning the second portion of the composite image on the second film with the first portion of the composite image on the first film;

dispensing the second film under tension along the length of the second film; detecting the first and second registration marks during the dispensing; varying the tension along the length of the second film based on the detection of the first and second registration marks to register the first and second portions of the composite image along the lengths of the first and second films;

detecting a distance between a leading edge and a trailing edge of the plurality of second registration marks, wherein the detected distance is indicative of a position across the width of the second film; and steering the second film to register the second portion of the composite image to the first portion of the composite image in a direction transverse to the length of the second film; and applying the second film to the substrate after the steering.

* * * * *

UNITED STATES PATENT AND TRADEMARK OFFICE

CERTIFICATE OF CORRECTION

PATENT NO. : 6,824,638 B1
DATED : November 30, 2004
INVENTOR(S) : Anderson, Conrad V.

It is certified that error appears in the above-identified patent and that said Letters Patent is hereby corrected as shown below:

Column 4,
Line 3, delete “5%” before “Suitable”.

Column 9,
Line 39, delete “marls” and insert -- marks --, therefor.
Line 46, delete “fist” and insert -- first -- therefor.

Column 11,
Line 5, delete “rum”and insert -- film --, therefor
Line 10, delete “th” and insert -- the --, therefor.
Line 14, delete “alone” and insert -- along --, therefor.
Line 45, delete “on” and insert -- one --, therefor.
Line 48, insert -- a -- before “position”.

Column 12,
Line 6, after “providing” insert -- a --.
Line 37, delete “distribute”and insert -- distributed --, therefor.

Signed and Sealed this

Tenth Day of May, 2005

JON W. DUDAS
*Director of the United States Patent and Trademark Office*